United States Patent [19]

Maloberti et al.

[11] Patent Number: 5,346,333
[45] Date of Patent: Sep. 13, 1994

[54] PROCESS FOR LAYING FLEXIBLE TUBULAR CONDUITS USING A PLURALITY OF SHIPS

[75] Inventors: René Maloberti, Champigny; Alain Coutarel, Paris, both of France

[73] Assignee: Coflexip, France

[21] Appl. No.: 776,392

[22] PCT Filed: Apr. 2, 1991

[86] PCT No.: PCT/FR91/00263
§ 371 Date: Jan. 23, 1992
§ 102(e) Date: Jan. 23, 1992

[87] PCT Pub. No.: WO91/15696
PCT Pub. Date: Oct. 17, 1991

[30] Foreign Application Priority Data

Mar. 30, 1990 [FR] France .................. 90 04102

[51] Int. Cl.5 .................................................. F16L 1/04
[52] U.S. Cl. .................................. 405/168.3; 405/158; 405/168.4
[58] Field of Search .................... 405/165–169, 405/158

[56] References Cited

U.S. PATENT DOCUMENTS

| | | | |
|---|---|---|---|
| 3,136,529 | 6/1964 | Dickinson et al. | 405/166 X |
| 3,372,461 | 3/1968 | Tesson | 405/168.3 X |
| 3,685,306 | 8/1972 | Mott | 405/168.4 X |
| 4,117,692 | 10/1978 | Oberg | 405/168.3 |
| 4,260,288 | 4/1981 | Ellers et al. | 405/168.3 |
| 4,913,080 | 4/1990 | Kindem et al. | 405/166 X |

FOREIGN PATENT DOCUMENTS

| | | | |
|---|---|---|---|
| 0302038 | 2/1989 | European Pat. Off. | |
| 2456141 | 8/1976 | Fed. Rep. of Germany | |
| 1293926 | 4/1962 | France | 405/166 |
| 441135 | 1/1968 | Switzerland | 405/166 |
| 1145202 | 3/1985 | U.S.S.R. | 405/168.4 |

OTHER PUBLICATIONS

Petrole Informations, Jan.-Feb. 1988, "What Flowline Installation Method", pp. 97-100.
International Search Report, PCT/FR91/00263, Jul. 1991, European Patent Office.

*Primary Examiner*—Dennis L. Taylor
*Attorney, Agent, or Firm*—Hoffman, Wasson & Gitler

[57] ABSTRACT

A process for laying flexible conduits on an ocean floor by continuous unrolling of the conduit at a laying site from at least one supply ship to a laying ship, wherein the flexible conduit is gradually transferred from the supply ship to a storage means located on the laying ship.

9 Claims, 6 Drawing Sheets

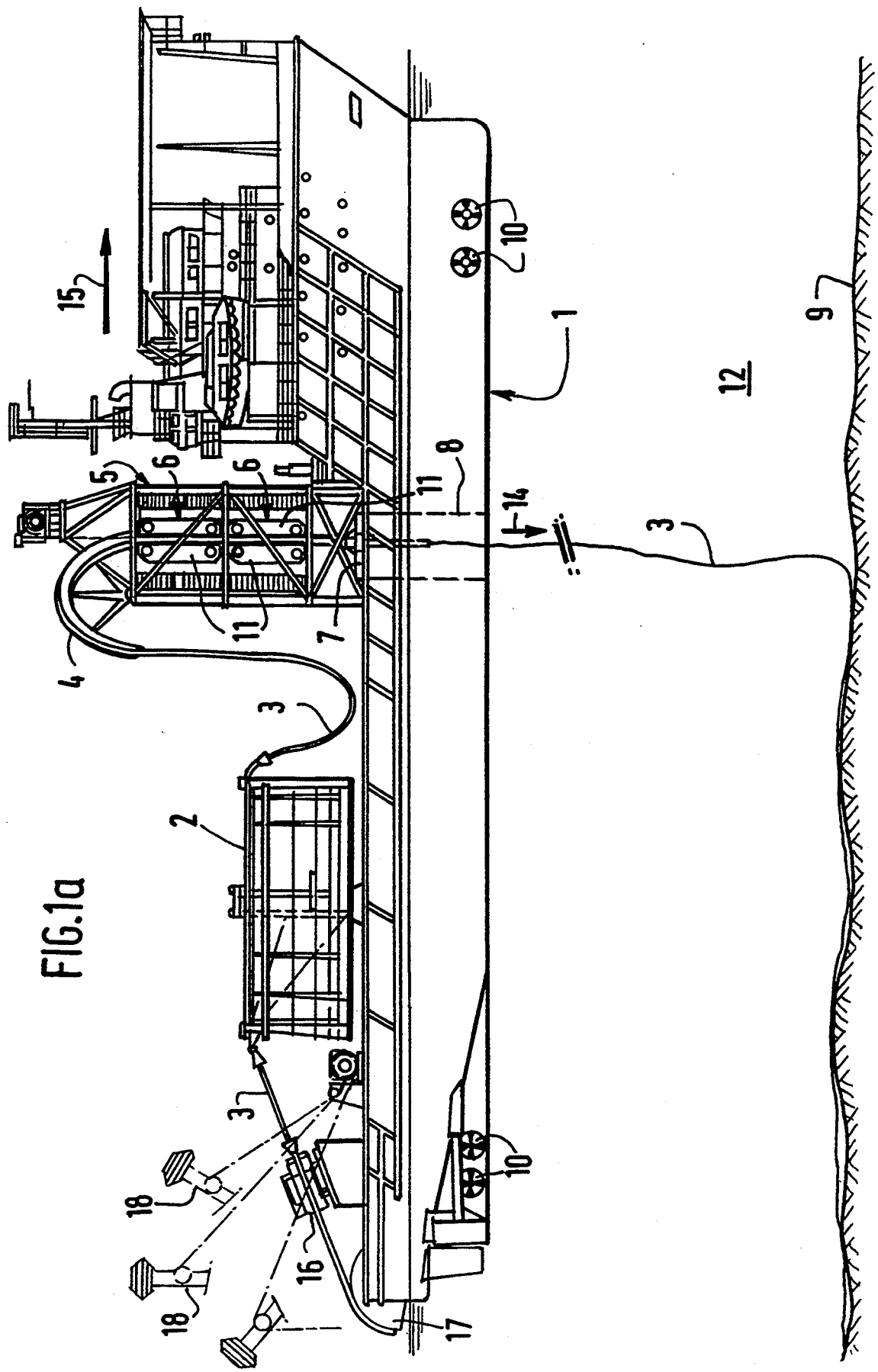

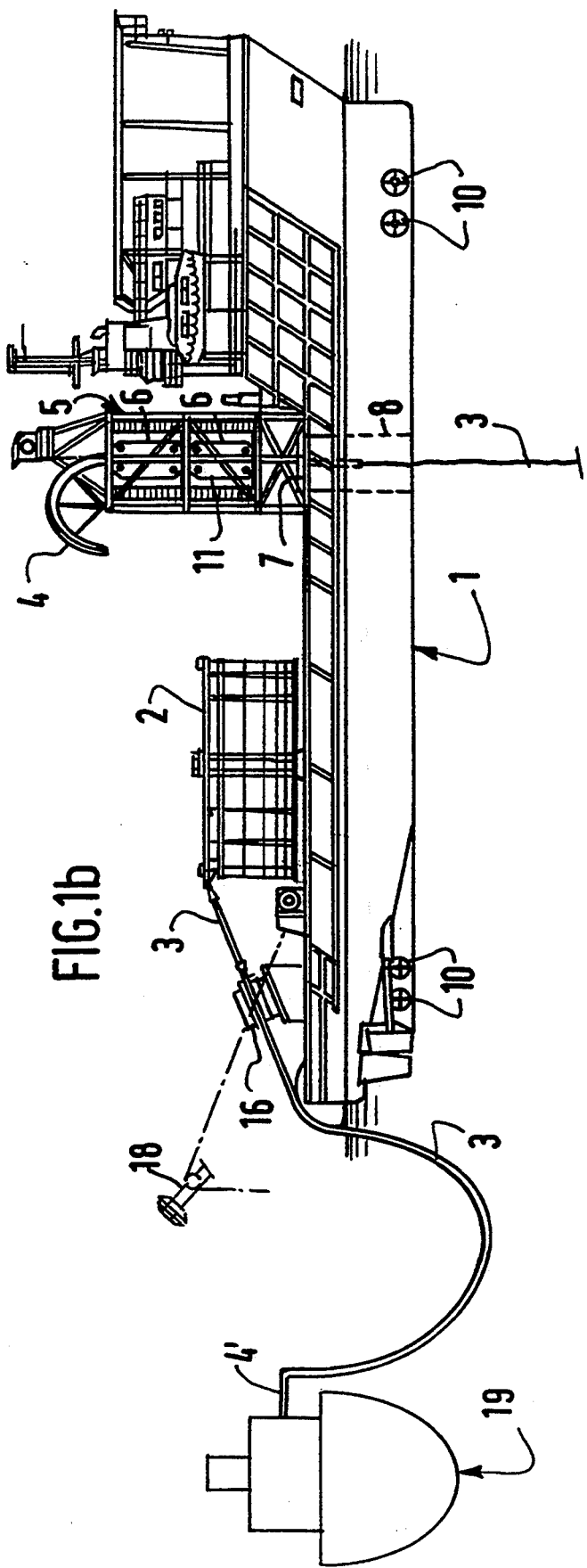

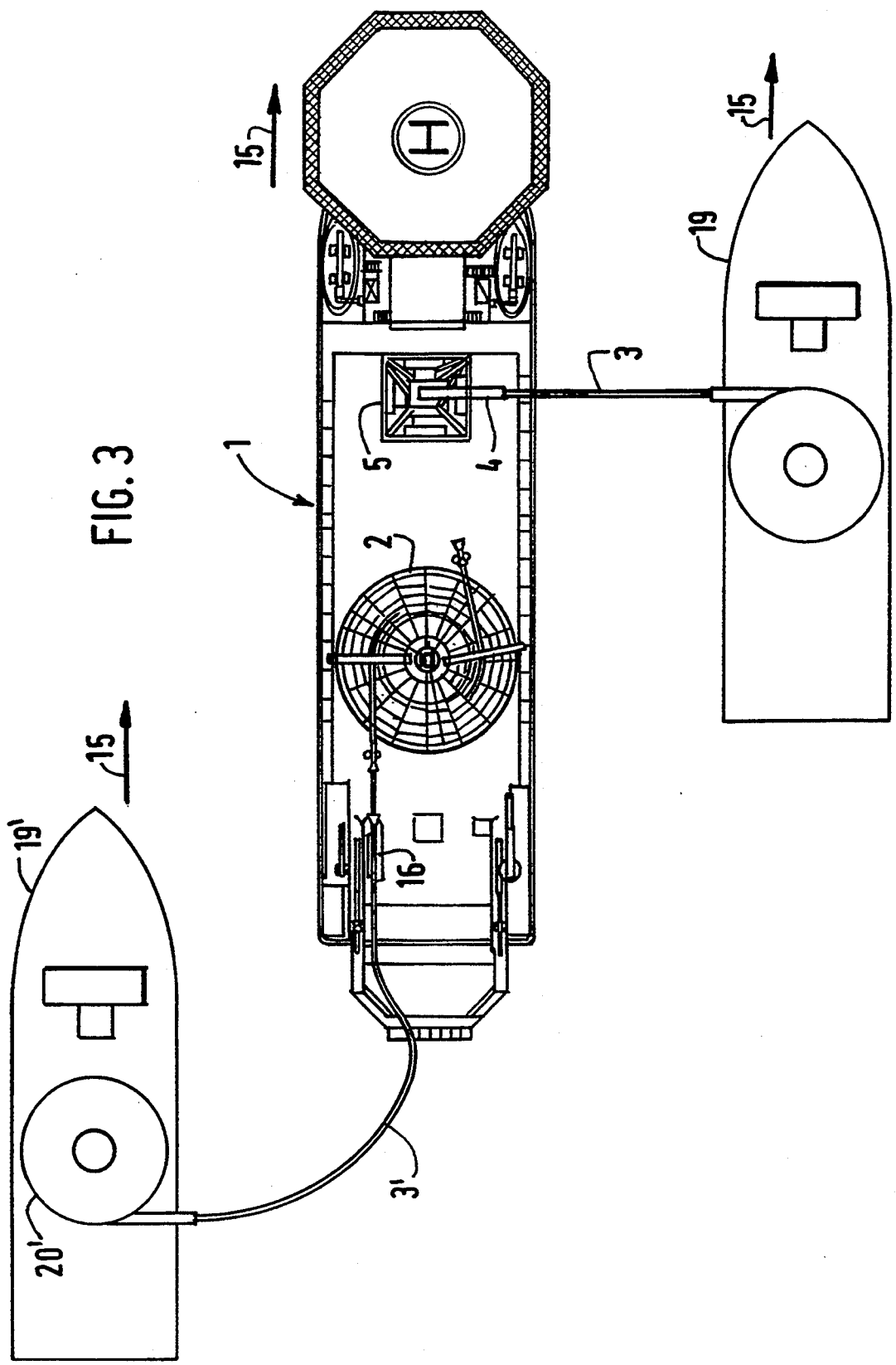

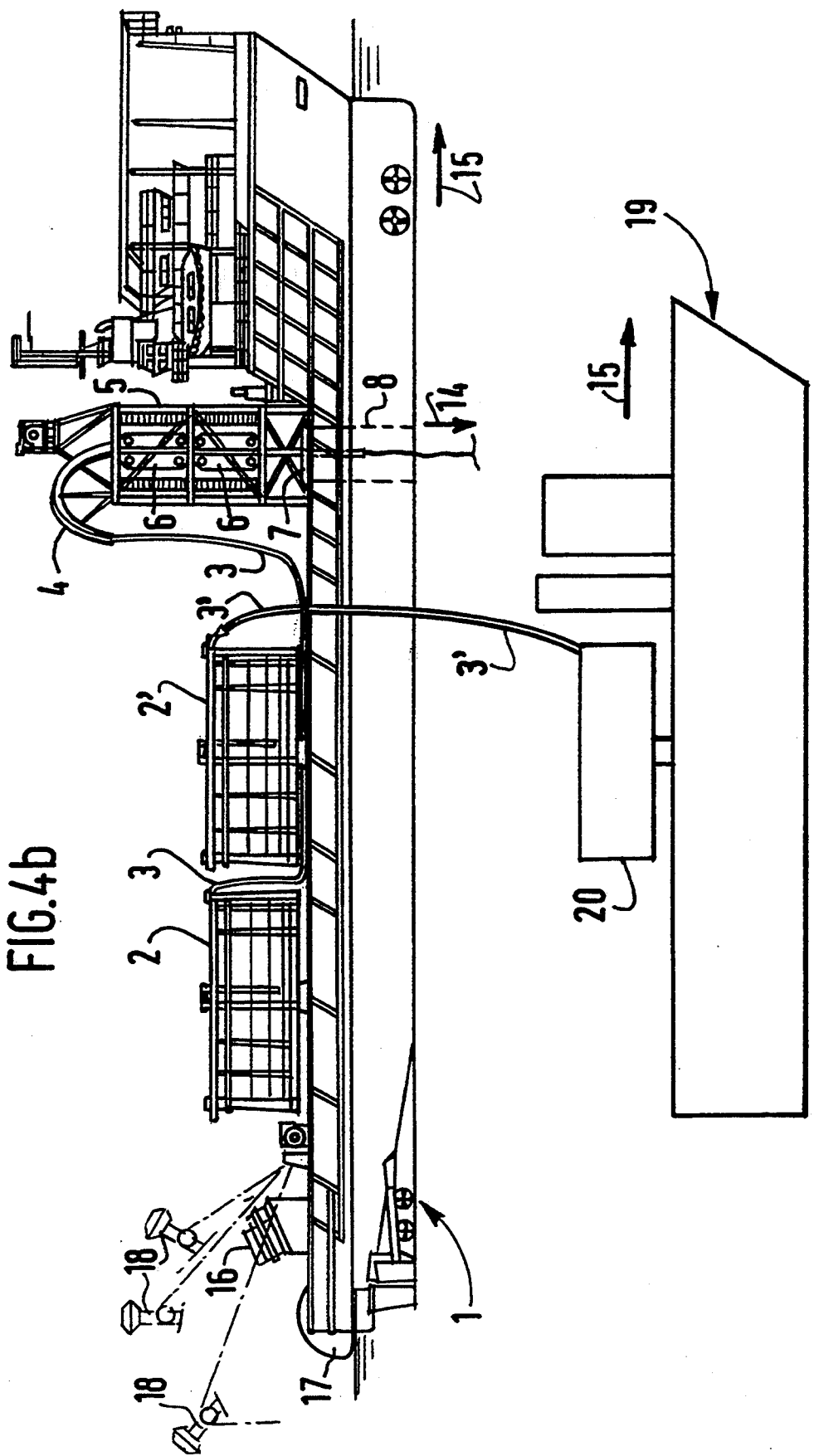

PROCESS FOR LAYING FLEXIBLE TUBULAR CONDUITS USING A PLURALITY OF SHIPS

The invention relates to a process for laying flexible conduits, in particular flexible tubular conduits and cables using in particular a laying ship and at least one supply ship.

This invention applies both to flexible tubular conduits and to cables, in particular to the electric cables, called flexible conduits below.

To assure the transport of fluids, such as, for example, hydrocarbons in offshore installations, it is known to place flexible tubular conduits on the ocean floor. The laying of flexible tubular conduits is assured by a laying ship. During the laying, the flexible tubular conduit is stored in a cage assuring its unrolling during the laying. The capacity of such a cage is limited. Once the length of flexible tubular conduits contained in the cage is unrolled, the laying operations are stopped momentarily. It is necessary to note that the interruptions are particularly detrimental in the case of laying flexible tubular conduits. Actually, one of the many advantages of these flexible tubular conduits resides in the speed of their laying. This speed makes possible, in particular, a short stopping of the laying ship whose daily cost is very high.

On the other hand, it is known to use supply ships to assure the supply, apart from the laying operations of the laying ship. For this purpose, supply (supply or supply vessel in English terminology) ships are used whose daily operating cost is very clearly lower than that of the laying ship.

The process for laying flexible tubular conduits according to this invention is made faster by using ships for supplying the laying ship with hose at the very site of the laying. Thus, there is full benefit from the fact that the laying operation itself of a flexible tubular conduit is very fast. Moreover, it is possible to use several supply ships taking over from each other to supply the laying ship continuously with flexible tubular conduits.

The laying ship and/or the supply ship are equipped with means for storing flexible conduits. For example, at least one cage with a vertical axis and/or at least one coil, advantageously motorized and advantageously with a horizontal axis, are used.

In a first variant embodiment of the process according to this invention, the stages of laying and the stages of transferring flexible conduits are alternated. The loading is performed, for example, on a cage for storing flexible conduits on a laying ship. Once the cage is loaded, the laying of the flexible conduit section which is in the cage is performed. When the cage is empty, a new cycle is begun, by restocking the cage with flexible conduits. It is possible to use a plurality of supply ships shuttling between the port and the laying ship to assure the continuity of the laying operations.

In a second variant of the process according to this invention, the laying ship directly performs the laying of a flexible conduit which is provided to it by a supply ship. Advantageously, a new full supply ship takes the place of the preceding supply ship when the latter is empty. During this time, the empty supply ship is freed or will be restocked in the port or by another ship.

In a third variant embodiment of the process according to this invention, the supply ship or ships simultaneously provide a plurality, for example two, of flexible conduits to the laying ship. A first flexible conduit is directly laid by a laying ship from the supply ship. The second flexible conduit is stored in a storage means of the laying ship, for example, a storage cage with a vertical axis of rotation. When the supply ship does not have any more flexible conduits, the laying ship continues the laying from the storage means. During this time, the supply ship can be resupplied with flexible conduits, for example, in a port, or can be replaced by another supply ship.

In a fourth variant of the process according to this invention, a laying ship comprising at least two means of storing flexible conduits, for example, two cages, is used. Each cage alternately plays the role of receiving flexible conduits from a supply ship or from cages for laying flexible conduits on the ocean floor. When the cage assuring the laying of the flexible conduit is empty, the roles of the two cages are reversed.

The use of a first cage for the transfer of the flexible conduit from the supply ship to the laying ship and a second cage for laying the flexible conduit makes it possible to assure the optimal continuity of the laying process. The reversal of the roles of the cages is a relatively quick process.

Advantageously, cages having a large capacity are used for the process according to this invention. In any case, the flexible conduit is unrolled from the supply ship to the laying ship. That is, the flexible conduit is transferred in a continuous way between the supply ship and the laying ship, advantageously with an approximately constant linear speed.

In a first embodiment, the transferred flexible conduit has a shape of a small chain between the two floating supports. In a second embodiment, the tubular conduit floats between the two floating supports during its transfer.

The invention mainly has as its object a process for laying flexible conduits in particular on the ocean floor, characterized by the fact that it comprises the stage of transfer, to the laying site, of a flexible conduit to be laid between at least one supply ship and the laying ship.

The invention also has as its object a process for laying flexible conduits, in particular on the ocean floor, characterized by the fact that it comprises a series of stages consisting in:

loading, with a flexible conduit to be laid, a storage means of a laying ship from a supply ship;

laying the flexible tubular conduit from the storage means of the laying ship.

The invention will be understood better by the description below and accompanying figures given as nonlimiting examples, of which:

FIGS. 1a and 1b is a diagram illustrating a first variant of the process according to this invention;

FIG. 3 is a diagram illustrating a third variant of the process according to this invention;

FIG. 4a and 4b is a diagram illustrating a fourth variant of the process according to this invention.

In FIGS. 1 to 4, the same references have been used to designate the same elements.

Figure 2:
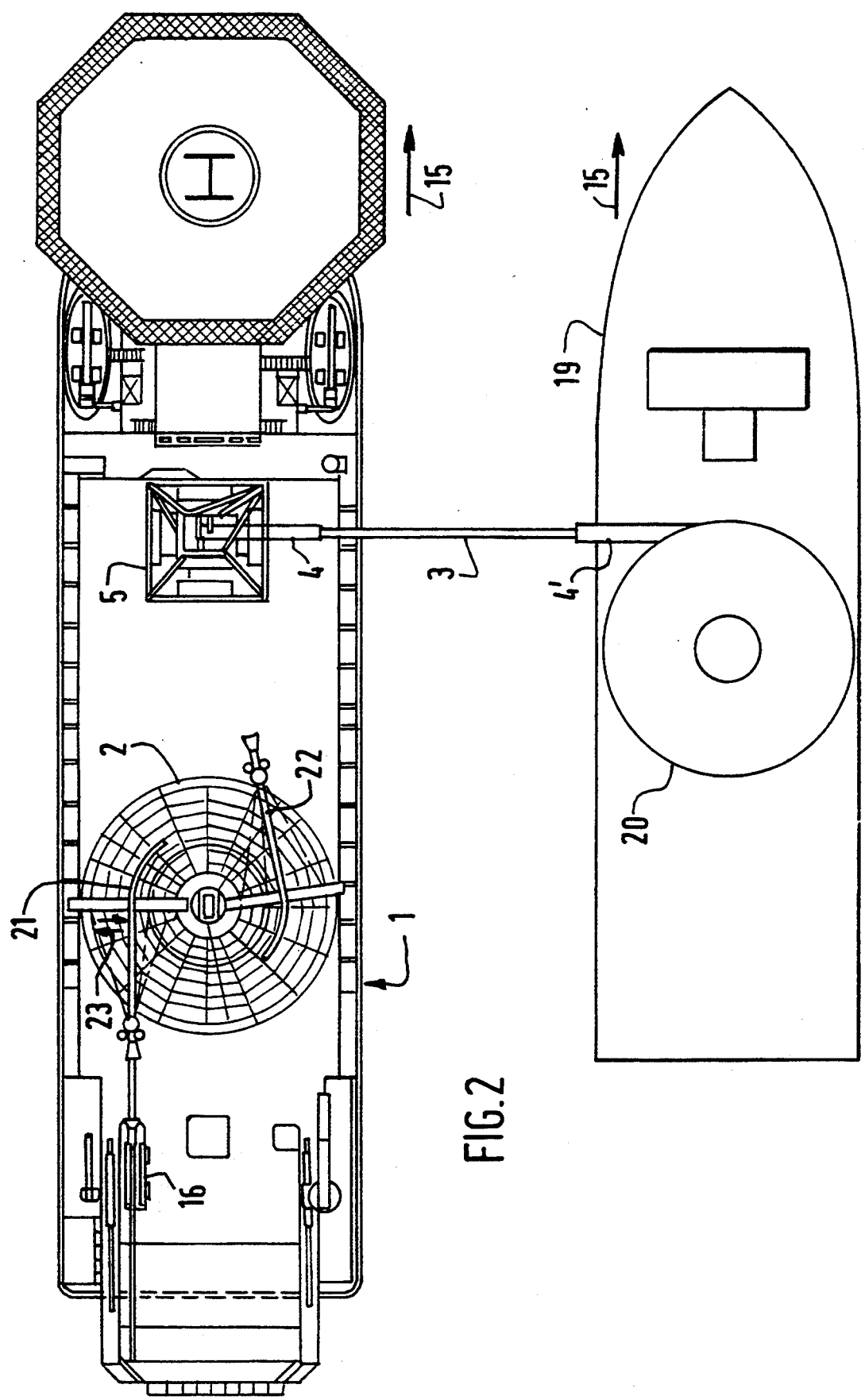
FIG. 2 is a diagram illustrating a second variant of the process according to this invention.

In FIGS. 1 to 4, a process for laying flexible tubular conduits using tensioning means placed on the vertical part of the path of the flexible tubular conduit has been illustrated. Of course, the use of a standard laying process does not go outside the scope of this invention.

In the first variant, the process according to this invention comprises a series of laying stages illustrated in FIG. 1a and of stages of transferring flexible tubular conduits between a supply ship 19 and laying ship 1, illustrated in FIG. 1b. A transferring stage of FIG. 1b follows the laying stage of FIG. 1a, the transferring stage itself followed by a laying stage of FIG. 1a, and so on until achieving the laying of a desired length of flexible tubular conduit 3, or until a momentary interruption of the laying.

In FIG. 1a, an example of laying ship 1 of improved type, comprising in particular dynamic positioning means 10, has been illustrated.

Ship 1 comprises storage means 2 of flexible tubular conduit 3, guide means 4 of flexible tubular conduit 3 and tensioning means 6.

Storage means 2 advantageously comprise a cage of approximately cylindrical shape with a vertical axis.

The guide means comprise, for example, a wheel, or, as illustrated in the figure, a chute 4 making it possible for flexible tubular conduit 3 to take a vertical path. Between cage 2 and guide means 4, flexible tubular conduit 3 takes the shape of a small chain.

Tensioning means 6 have been placed at the output of guide means 4. In the example illustrated in the figure, two tensioning means 6, mounted on a derrick 5 of approximately parallelepipedic rectangular shape, have been placed in series. Other shapes, for example, the pyramidal shape, do not go outside the scope of this invention. Tensioning means 6 are placed vertically downstream from guide means 4, storage means 2 and upstream from a work table 7 making possible the handling of flexible tubular conduit 3. Tensioning means 6 are intended to support the weight of flexible tubular conduit 3 placed vertically up to ocean floor 9. Tensioning means 6 comprise, for example, a plurality of tracks 11. For example, each tensioning means 6 comprises 2, 3 or 4 tracks 11 which exert a tightening force on tubular conduit 3. The simultaneous advance of tracks 11 exerting the tightening force on tubular conduit 3 makes possible the lowering of tubular conduit 3 along arrow 14. Simultaneously, ship 1 advances, for example, along arrow 15, ship 1 being able to move, thanks to dynamic positioning means 10, in any direction.

The fact of using tensioning means 6 placed vertically makes it possible to make tubular conduit 3 pass through an opening 8 in ship 1 called the moon pool in English terminology. This arrangement avoids having tensioning means 6 and chute 4 placed at the back of the ship. A back position of chute 4 jeopardizes the balance of ship 1.

Ship 1 comprises means making possible the transfer at sea of flexible tubular conduits 3 from a supply ship 19 of FIG. 1b. In the example illustrated in FIG. 1a, the transferring means placed in the back comprise a chute 17, a tensioning means 16. Tensioning means 16 comprise, for example, two diametrically opposite tracks.

When ship 1 has used up the amount of stored flexible tubular conduits 3, internal storage means 2, the laying of conduits 3 symbolized by arrow 14 and the advance of ship 1 symbolized by arrow 15 are stopped simultaneously. The stopping of the laying is performed while keeping the end of the flexible tubular conduit on ship 1. The initialization of the transfer is obtained by bringing one end of flexible tubular conduit 3 from supply ship 19 to laying ship 1. For example, a cable attached to said end which is going to be attached to a cable pulled by a winch, is transferred. By pulling on the cable, the end of flexible tubular conduit 3 is brought aboard laying ship 1. Conduit 3 passes by tensioning means 16 to go toward storage cage 2. The transfer illustrated in FIG. 1b uses storage means (not represented in the figure) and guide means 4' of supply ship 19 making it possible for transferred flexible tubular conduit 3 to form a small chain ending in the transfer means of ship 1, chute 17 in the example illustrated in FIG. 1. The small chain formed by tubular conduit 3 can be immersed in the sea water as well as be only suspended in air.

Advantageously, during the transfer, the complete loading of the cage of ship 1 is performed. Thus, the number of end fittings necessary for the laying of the flexible tubular conduit is reduced.

Supply ship 19 comprises storage means comprising, for example, the same type as cage 2 or reels. Once the transfer operation is ended, the flexible tubular conduit is brought from cage 2, by guide means 4, and tensioning means 6 at the level of work table 7. At this level, the assembly of the front ends of flexible tubular conduit 3 transferred with the back end of tubular conduit 3 already laid is performed. The assembly is performed, for example, by welding, flanging or bolting of end fittings.

At that time, the laying operation illustrated in FIG. 1a can be resumed. Supply ship 19 can either accompany laying ship 1, in particular if it has a sufficient capacity to contain the section of flexible tubular conduit 3 necessary for the next transfer, or leave again toward the port for supplies. The use of a plurality of supply ships 19 to perform the transfer of flexible tubular conduits 3 during each transfer stage illustrated in FIG. 1b does not go outside the scope of this invention.

In FIG. 2, it is possible to see an example of laying flexible tubular conduits using a second process according to this invention. In the example illustrated in FIG. 2, laying ship 1 directly lays a flexible tubular conduit 3 provided by a supply ship 19. In the example illustrated in FIG. 2, supply ship 19 comprises a cage 20 similar to cage 2 of laying ship 1.

Tubular conduit 3 directly forms a small chain between guide means 4 of ship 1 and guide means 4' of ship 19. As illustrated by arrows 15, these two ships advance side by side having approximately the same speed. Their distance is, for example, approximately equal to 40 meters.

Advantageously, as soon as supply ship 19 has used up its supply of flexible tubular conduits, it is replaced by a new full supply ship (not represented in the figure).

It is possible to fill cage 2 of laying ship 1 as well as to leave it empty. Filled cage 2 makes it possible to continue laying flexible tubular conduits 3 in the absence of supply ship 19. An empty cage 2 makes ship 1 lighter, and more stable.

In FIG. 2, it is possible to see the mechanism for loading and unloading flexible tubular conduits in cage 2. For the loading, a coiler arm 21 is used whose displacement symbolized by arrow 23 makes possible the winding of flexible tubular conduit 3 approximately in a spiral. Also, a coiler arm 22 following the same movement illustrated by arrow 23 makes it possible to unload flexible tubular conduit 3 from cage 2 to, for example, guide means 4.

Of course, the use of a laying ship 1 not comprising means for storing flexible tubular conduits does not go outside the scope of this invention.

In FIG. 3, it is possible to see the third example of the process according to this invention. In this case, two sections of tubular conduits 3 and 3' are transferred simultaneously between the supply ship and the laying ship. Flexible tubular conduit 3 provided by supply ship 19 is directly laid by laying ship 1. Simultaneously, a tubular conduit 3' is provided by a supply ship 19' from its storage means 20'. Conduit 3' is stored in cage 2 of ship 1. If laying ship 1 is in the process of laying flexible tubular conduit 3, three ships 1, 19, 19' advance simultaneously with approximately the same speed as illustrated by arrow 15.

The two small chains of flexible tubular conduits 3 and 3' can be provided by the same supply ship or, as illustrated in FIG. 3, by different supply ships. The fact of loading cage 2 of ship 1 gives it a laying autonomy corresponding, for example, to 30,000 m of flexible tubular conduits of an inner diameter approximately equal to 7.5 cm (three inches in using the English measurement) corresponding to a laying time of 6 to 7 days, or 5000 meters of flexible tubular conduits and an inner diameter approximately equal to 30 cm (twelve inches in using the English measurement) corresponding to a laying time of one day to one and a half days. This example is given for flexible tubular conduits 3 intended to be laid at a depth of 1000 meters and withstanding an internal working pressure of 210 bars (approximately 3000 p.s.i., in using the English measurements). The autonomy provided by the presence of cage 2 makes it possible to free supply ship 19 and/or 19'.

The laying ship and the supply ship have approximately the same average speed. This speed is, for example, equal to the laying speed, for example, between several meters per hour to 800 meters per hour. This speed is preferably between 300 and 500 meters per hour, typically 300 meters per hour. The transfer of flexible tubular conduit between the storage means of ship 19 and the laying ship can, for example, be performed at the linear speed of 500 meters per hour.

Figure 4A:
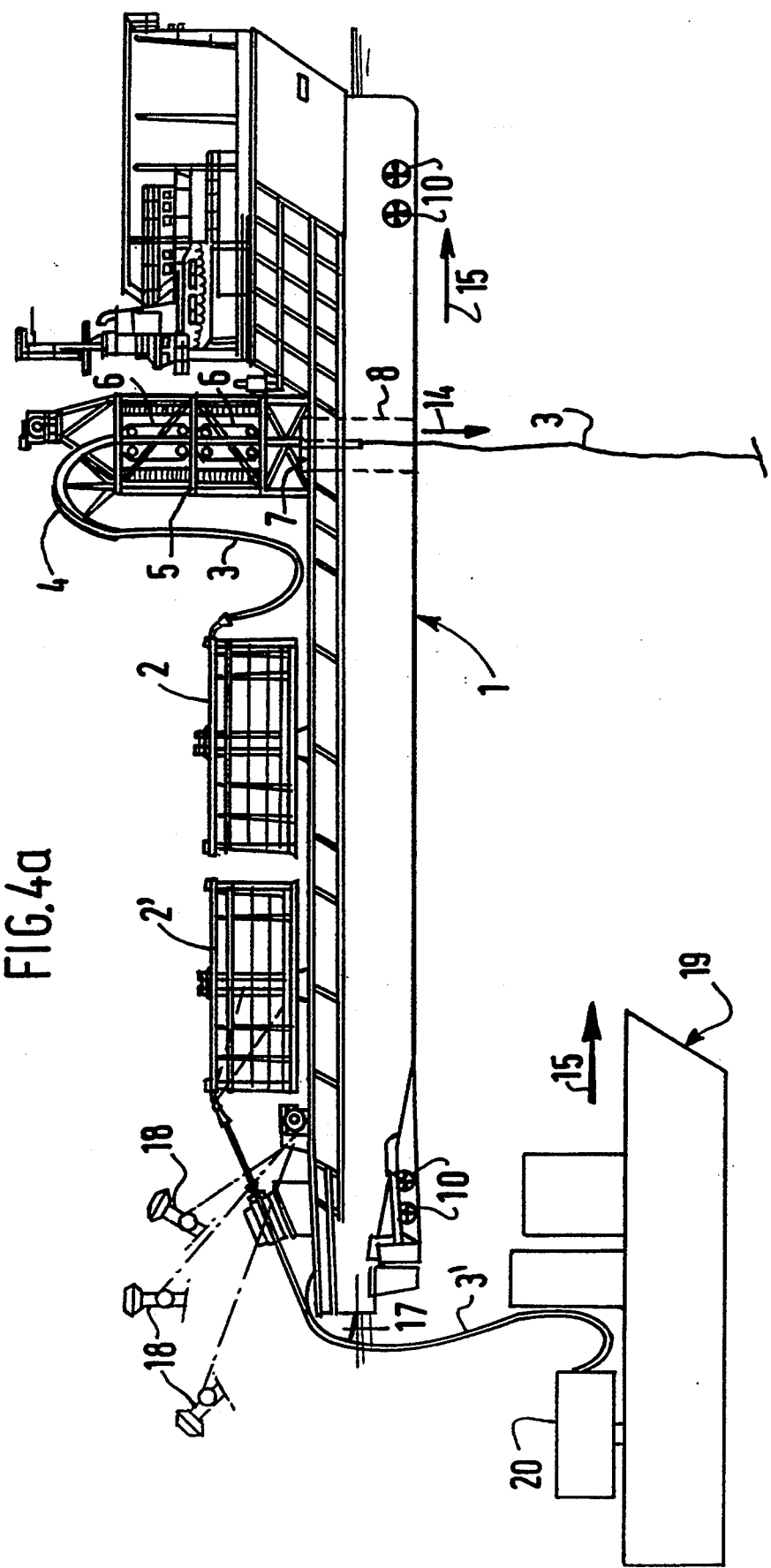

In FIG. 4, it is possible to see a fourth process example according to this invention using a laying ship 1 comprising two storage cages referenced 2 and 2'. In FIG. 4a, cage 2 makes possible the laying of flexible tubular conduits 3 on the ocean floor, as symbolized by arrow 14, cage 2' being loaded with a tubular conduit 3' from cage 20 of a supply ship 19. Once cage 2' of supply ship 1 is loaded with flexible tubular conduit 3', supply ship 19 is freed. This can occur before the end of the laying of flexible tubular conduit 3 from cage 2. Supply ship 19 can then be supplied in a port for, as illustrated in FIG. 4b, making possible the supply of the cage from which flexible tubular conduit 3 is in the process of being laid. Of course, the use of a plurality of supply ships 19 taking over from each other with laying ship 1 does not go outside the scope of this invention.

In the example illustrated in FIG. 4a, laying ship 1 performs the laying from cage 2 placed immediately after derrick 5. Cage 2' loaded with flexible tubular conduit 3' from ship 19 is located at the back of the ship. Of course, the use of cages 2, 2' distributed on both sides of opening 8 of ship 1 does not go outside the scope of this invention.

In the example illustrated in FIG. 4b, flexible tubular conduit 3 is laid on the floor from the back cage, which, in FIG. 4b, carries reference 2. Tubular conduit 3 is brought by horizontal guide means up to guide means 4 making possible its passage to the vertical at the level of derrick 5. The cage closet to opening 8 being used for transferring tubular conduit 3' from a supply ship 19, in FIG. 4b, carries reference 2'. The exchange of roles of cages 2, 2' makes it possible to assure the continuity of the laying of flexible tubular conduits on the ocean floor.

It is evident that during the transfer, the laying ship and the supply ship have approximately the same average speed. During the laying, the supply ship controls the speed at the average speed of the laying ship.

The invention applies mainly to the laying of flexible tubular conduits of great length intended for the transport of hydrocarbons as well as the laying of deep-sea electric cables on the ocean floor.

We claim:

1. A process for transferring flexible conduits from at least one supply ship to a laying ship for laying said conduits onto an ocean floor, comprising transferring a flexible conduit to be laid on said ocean floor by continuous unrolling at a laying site from at least one supply ship to a laying ship, said supply ship and said laying ship being separated from one another and connected only by said flexible conduit, wherein said flexible conduit is gradually transferred from said supply ship to a storage means located on said laying ship.

2. A process for transferring flexible conduits from at least one supply ship to a laying ship for laying said conduits onto an ocean floor, in accordance with claim 1, wherein a conduit portion located between said at least one supply ship and said laying ship has the shape of a catenary.

3. A process for transferring flexible conduits from at least one supply ship to a laying ship for laying said conduits onto an ocean floor, in accordance with claim 1, wherein a conduit portion located between said at least one supply and said laying ship floats on the surface of the water.

4. A process for transferring two sections of flexible conduits from at least one supply ship simultaneously to a laying ship for laying said two sections of conduits onto an ocean floor, comprising transferring said two sections of flexible conduits by continuous unrolling at a laying site from at least one supply ship to said laying ship, wherein one section of flexible conduits is loaded into a storage means located on said laying ship for future laying and said other section of flexible conduit is transferred to said laying ship for direct laying onto said ocean floor.

5. A process for transferring two sections of flexible conduits from at least one supply ship simultaneously to a laying ship for laying said two sections of conduits onto an ocean floor, in accordance with claim 4, wherein a portion of each of said two sections of flexible conduit located between said laying ship and at least one supply ship has the shape of a catenary.

6. A process for transferring two sections of flexible conduits from at least one supply ship simultaneously to a laying ship for laying said two sections of conduits onto an ocean floor, in accordance with claim 4, wherein a portion of each of said two sections of flexible conduit located between said laying ship and at least one supply ship floats on the surface of the water.

7. A process for transferring flexible conduits from at least one supply ship to a laying ship for laying conduits onto an ocean floor comprising transferring a flexible conduit to be laid on said ocean floor by continuous unrolling at a laying site from at least one supply ship to a storage cage located on said laying ship, wherein said laying ship comprises at least two storage cages and transfers flexible conduit to said ocean floor directly from a first storage cage while a second storage cage is being filled by a supply ship; once said first storage cage is emptied, said laying ship then lays flexible conduit located in said second storage cage onto said ocean floor, while said first storage cage is being refilled by said supply ship.

8. A process in accordance with claim 7, wherein a portion of said flexible pipe located between said supply ship and said laying ship has the shape of a catenary.

9. A process is accordance with claim 7, wherein a portion of said flexible pipe located between said supply ship and said laying ship floats on the surface of the water.

* * * * *